R. A. McCLURE AND W. W. BOULTON.
RAILWAY CAR TRUCK.
APPLICATION FILED JUNE 19, 1918.

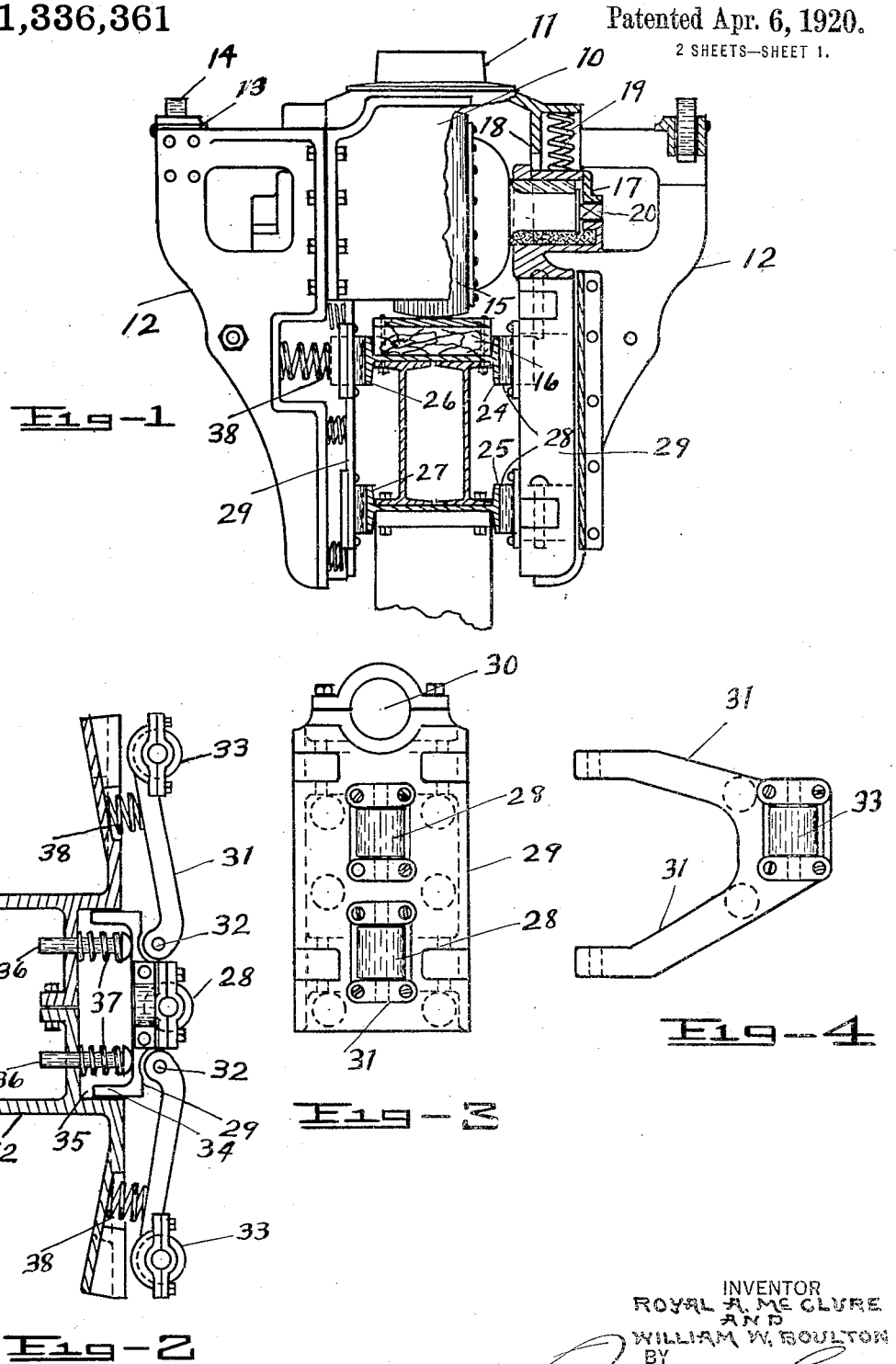

1,336,361.

Patented Apr. 6, 1920.
2 SHEETS—SHEET 2.

INVENTOR
ROYAL A. McCLURE
AND
WILLIAM W. BOULTON
BY
ATTORNEY

UNITED STATES PATENT OFFICE.

ROYAL A. McCLURE AND WILLIAM W. BOULTON, OF SEATTLE, WASHINGTON, ASSIGNORS TO UNIVERSAL ELEVATED RAILWAY CO., OF SEATTLE, WASHINGTON.

RAILWAY-CAR TRUCK.

1,336,361.     Specification of Letters Patent.      Patented Apr. 6, 1920.

Application filed June 19, 1918. Serial No. 241,078.

*To all whom it may concern:*

Be it known that we, ROYAL A. MCCLURE and WILLIAM W. BOULTON, citizens of the United States, residing at Seattle, in the county of King and State of Washington, have invented a new and useful Improvement in Railway-Car Trucks, of which the following is a specification.

This invention relates to certain improvements in railroad car trucks of the type that are adapted to travel on a single rail track structure, having a top tread rail and laterally disposed guide wheels, and the object of this improvement is to provide superimposed guide members medially of the truck frame and the track, the general constructions of the truck structure being disclosed in the pending application of Royal A. McClure, H. R. Stevens and William W. Boulton, filed February 20, 1917, for trucks and elevated railways, Serial No. 149,966.

A further object resides in the provision of emergency rollers located on both ends of the truck frame and adapted to engage the track rail and sustain the truck against derailment.

The invention consists in the novel construction, adaptation and combination of parts, of a railroad truck in combination with a track therefor, as will be more clearly described in the following specification, illustrated in the accompanying drawings and finally pointed out in the appended claims.

Figure 5:
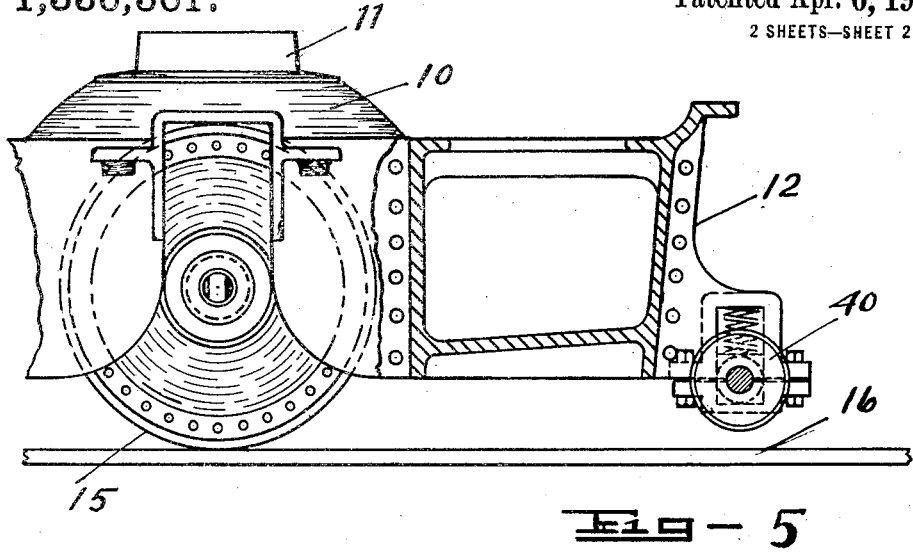
Figure 6:
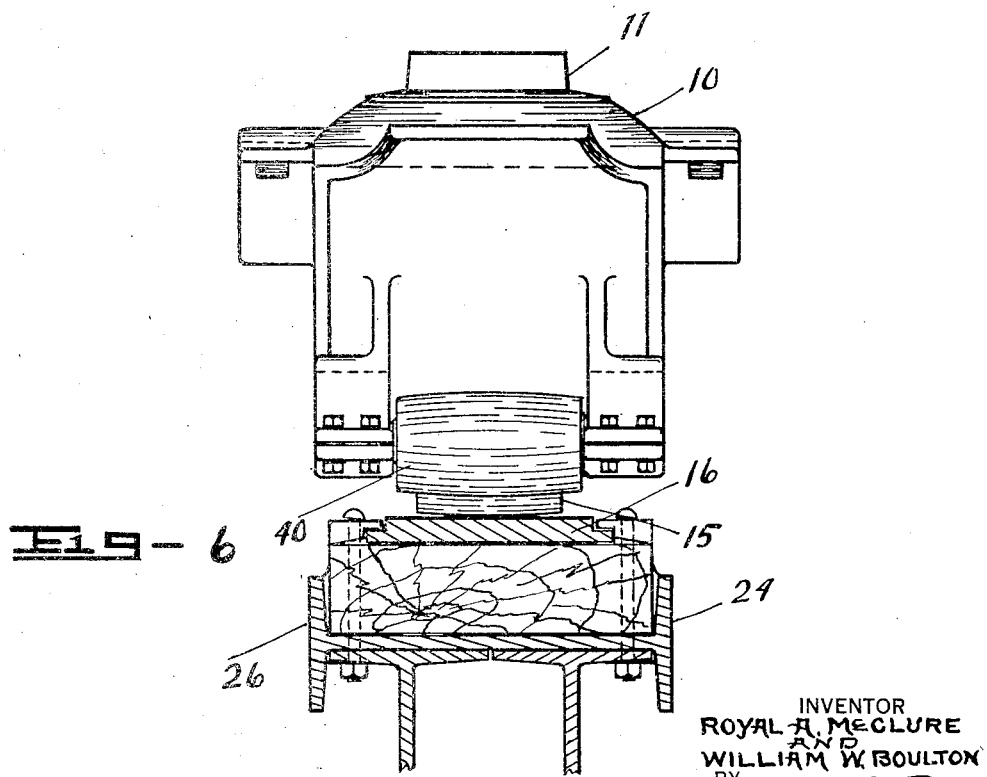

In the drawings, Figure 1 is a view in elevation of the truck construction, showing parts thereof in cross section; Fig. 2 is a fragmentary view, partly in section and partly in elevation substantially on broken line 7—7 of Fig. 1; Fig. 3 is a plan view of the vertical side bearing; Fig. 4 is a detailed plan view of the lateral side rollers; Fig. 5 is a side elevation of the emergency roller as it appears when incorporated in the ends of the truck frame; and Fig. 6 is an end view thereof.

Referring to the several views, throughout which like numerals indicate like parts, the numeral 10 indicates the top member of the truck frame having a centrally disposed upwardly directed circular member 11 that forms the pivot upon which the car body (not shown) may rest, and 12 are extensions or side members, preferably 4 in number, that are bolted to the frame and to each other, and form an inverted U shaped structure that is adapted to straddle a rail.

The outer portion of the members 12 are secured together by plates 13, having rollers 14 mounted therein that engage with tracks 60 on the car body (not shown) and prevent the bodies from tilting sidewise.

The truck is supported for movement on a motor wheel or drive wheel 15 that runs upon the main rail or tread 16 of a track of 65 a form more specifically described in the copending application of Royal A. McClure, Carl H. Reeves and William W. Boulton, filed February 20, 1917, Serial No. 149,968, such wheels being journaled in boxings 17 70 that are disposed in guides 18 in the truck frame which permits the boxings to move vertically, the weight of the truck frame being yieldingly supported upon the boxings 17 by helical compression springs 19 shown 75 in the broken away portion of Fig. 1.

The motor wheel is preferably constructed with a rotating field that forms part of the wheel itself and with a stationary armature that is secured to a shaft 20. Electric wires 80 not shown extend from the armature outwardly through the shaft 20 and may connect with a suitable trolley mechanism so that the electric current will be supplied to the motor.

The rail structure is provided with four guide rails 24, 25, 26 and 27, that are disposed in vertical planes, two on each side of the rail structure at the top and bottom thereof respectively and serve as tracks upon 90 which roller bearings 28, that are connected to the super-imposed plate member 29, may roll.

The above described construction thus far forms no part of the present invention other 95 than its relationship in combination to the following described adjacently super-imposed plate members 29.

These plates 29 are adjacently super-imposed upon the wheel shaft boxings 17 100 in a suspended relation on both sides of the motor wheel 15 and extend downwardly medially of the truck frame 12 and the track.

The roller bearings 28 are centrally disposed 105 in a vertical plane between slots provided in the plate 29 and such roller bearings are located midway between the two ends of the truck and being adapted to run on the top and bottom guide rails 24, 25, 110

26, and 27 respectively. The function of these roller bearings is to absorb the radial thrust and to sustain the truck frame in an upright position upon the rail.

The plates 29 have rearward extensions 34 that are adapted to fit within guides 35 in the truck frame 12 in such a manner that the plates are held in yielding contact with the side rails by bolts 36 slidably mounted within the guides 35 over helical compression springs 37.

31 are arms, two on each side of the super-imposed plates and extending forwardly and rearwardly thereof, such arms each being articulated at one end by pivots 32 with the plate members 29, each being provided on its outer end with roller bearings 33 attached thereto in any well known manner and held in yielding contact with the side track rails by helical compression springs 38.

These roller bearings are provided on the front and rear end of the truck for engagement with the upper guide rail only and hence serve to absorb any lateral thrust communicated thereto by the truck frame and co-act with each other to guide the truck around a curve.

40 are emergency rollers mounted centrally within suitable bearings beneath the respective ends of the truck frame and are adapted to engage the tread rail 16 in event the motor wheel should become disabled and thus sustain the truck against derailment.

The emergency rollers 40 in their normal position are disposed a short space above the surface of the rail and hence do not come in contact with the rail except in event of a breakdown of the motor wheel.

Obviously, various mechanical changes in the details of construction, such, for instance, as substituting ball bearings in place of roller bearings, can be resorted to within the scope of the following claims.

What we claim is new, and desire to protect by Letters Patent, is:

1. The combination with a track, of a truck frame, a single truck wheel supporting said frame on said track, roller bearings disposed on each side of said truck wheel independently of said truck frame to engage the opposite sides of said track, and other roller bearings disposed near the front and rear ends of said truck frame independently thereof to engage the opposite sides of said track.

2. The combination with a rail structure having a rail on its top and on its upper end, a lower guide rail disposed on each side thereof, of an arched truck frame adapted to straddle said rail structure, a truck wheel to support said frame, guide members supported by said truck wheel on both sides thereof and extending downwardly medially of said side rail and said arched frame, means disposed within said guide members adapted to engage said upper and lower side rails to support said truck frame in an upright position, and means disposed on the adjacent sides of said members adapted to engage the upper of said side rails and co-act to guide said truck around the curves.

Signed by us at Seattle, Washington, this 13th day of June, 1918.

ROYAL A. McCLURE,
WILLIAM W. BOULTON.

Witnesses:
R. J. COOK,
D. C. KUHNS.